United States Patent [19]

Apps

[11] Patent Number: 5,323,925
[45] Date of Patent: Jun. 28, 1994

[54] LOW-DEPTH, NESTABLE TRAYS FOR TRANSPORTING BEVERAGE CONTAINERS

[75] Inventor: William P. Apps, Anaheim, Calif.

[73] Assignee: Rehrig Pacific Company, Inc., Los Angeles, Calif.

[21] Appl. No.: 946,230

[22] Filed: Sep. 18, 1992

[51] Int. Cl.⁵ .............................................. B65D 1/38
[52] U.S. Cl. .................................... 220/507; 206/505; 206/507; 206/509; 206/511
[58] Field of Search ............... 220/507, 509, 515, 516, 220/518; 206/505, 509, 511, 512, 519, 427

[56] References Cited

U.S. PATENT DOCUMENTS

| | | | |
|---|---|---|---|
| D. 255,097 | 5/1980 | Carroll et al. | |
| 2,602,568 | 7/1952 | Kinney | 220/97 |
| 2,771,213 | 11/1956 | Lewis | 220/97 |
| 3,120,322 | 2/1964 | Henninger | 220/516 X |
| 3,148,797 | 9/1964 | Cloyd | 220/21 |
| 3,283,943 | 11/1966 | Cargnelutti | 220/97 |
| 3,347,398 | 10/1967 | Gould | 211/126 |
| 3,390,801 | 7/1968 | Adomat | 220/97 |
| 3,447,715 | 6/1969 | Beney | 220/97 |
| 3,680,735 | 8/1972 | Lucas | 206/511 |
| 3,734,341 | 5/1973 | Levenhagen | 220/97 |
| 3,791,549 | 2/1974 | Delbrouck et al. | 206/509 X |
| 4,011,948 | 3/1977 | Rehrig et al. | 206/507 |
| 4,256,224 | 3/1981 | Hirota | 206/505 X |
| 4,832,202 | 5/1989 | Newman et al. | 206/519 |
| 4,848,850 | 7/1989 | Wise | 206/519 |
| 5,115,937 | 5/1992 | Chausse et al. | 220/507 |

FOREIGN PATENT DOCUMENTS

| | | | |
|---|---|---|---|
| 786654 | 6/1968 | Canada. | |
| 732366 | 6/1955 | United Kingdom | 206/509 |

Primary Examiner—Steven M. Pollard
Attorney, Agent, or Firm—Banner, Birch, McKie & Beckett

[57] ABSTRACT

Reusable plastic trays of a "low-depth" design for storing and transporting beverage containers and for nesting when empty. The side structure of the tray defined by a rail, whose upper rim is otherwise prone to be overridden in "shingling" relation by an adjacent tray when the trays are disposed for filling, is provided with cam means adapted to engage the side structure of an adjacent tray and thereby prevent a shingling relation from occurring. The disclosed tray design includes a strut arrangement on each rectangular side in which the lower end of each strut is inclined and adapted to engage a cooperatively inclined surface on the side structure to tend to urge the side structure in an inward direction, thus to prevent spreading of the side structure during nesting of the trays. The structural relationship between the cam means and the strut arrangement prevents interference of one with the other in the performance of their respective operations. The described trays further include a shoulder raised from the top surface of the floor to effectively space the side structure of the tray from an adjacent fluid container.

30 Claims, 8 Drawing Sheets

LOW-DEPTH, NESTABLE TRAYS FOR TRANSPORTING BEVERAGE CONTAINERS

BACKGROUND OF THE INVENTION

The present invention relates to low-depth, nestable trays for transporting beverage containers, such as aluminum cans.

Beverage cans are often stored and transported during the distribution stages in short-walled carboard boxes or in reusable, lightweight plastic trays intended to supplant such boxes. One such form of plastic tray is shown and described in U.S. patent application Ser. No. 07/369,598, filed Jun. 21, 1989 by the Applicant hereof and assigned to the Assignee hereof, the contents of which patent application are hereby incorporated herein by reference.

While the plastic tray device embodied in application Ser. No. 07/369,598 constitutes a significant improvement over short-walled cardboard boxes, the invention described herein improves upon the design of such tray in overcoming certain disadvantages prevalent in the use of low-depth plastic trays. For example, in the shipment of trays filled with cans, when large numbers of such trays are deposited in layers on pallets for ultimate transfer to transport apparatus, the trays are arranged in close side-by-side and end-to-end relation on a palletizing device positioned above the pallet to receive the layer of trays. In practice the trays are disposed on a floor panel of the palletizer, which panel is adapted to be withdrawn so that the trays supported thereon will be caused to drop a slight distance onto the underlying pallet or previously deposited tray layer thereon. Because the panel is withdrawn from one end to the other of the supported set of trays, as the panel moves out from under each tray, or line thereof, the trays will fall in sequence. The weight of the can load borne by each tray prevents their being dropped in perfect parallelism onto the surface below. Instead, the weight of the load tends to move the falling tray slightly such that it tends to move in the direction of the previously passed tray whereby the rail forming the side structure of the falling tray is caused to land on, and thus be retained by, the upper edge or rim of the rail of the adjacent tray. This overlapping of adjacent trays causes one end of the tray to be raised with respect to the other and is commonly referred to as "shingling". Shingling, it will be appreciated, is disruptive of load stability on the pallet since it initially prevents the achievement of a perfectly squared load. Subsequently, moreover, disengagement of the shingled trays, as for example when the palleted loads are being transported, creates a change in load configuration and perhaps even a load shift, both of which are undesirable.

Another problem addressed by the present invention occurs as a result of stacking empty trays in nested relation. Due to the fact that the side structures of the trays have a general configuration of being upwardly divergent, particularly because of inwardly extending, inclined columns that are spaced about the periphery of the tray to supportively space the side structure rail from the tray floor when a great number of trays are nested to create a high stack, those trays positioned toward the bottom of the stack are subjected to substantial compressive loads. Such loads, it will be appreciated, create a tendency of the sides of the compressively loaded trays to spread thereby permitting the overlying tray to be pressed downwardly into the subjacent tray. With the nested trays so-compressed there is, at best, a difficulty created in separating the trays at time of use. At worst, the trays, being formed of light weight plastic material, can become damaged.

Still another problem addressed by the invention is the potential damage to the fluid containers that are thin-walled numbers formed of a relatively fragile material, such as aluminum. In trays of the "low depth" type a recurring problem is that any tipping of the containers standing immediately adjacent the side structure of the tray can, when the container wall impacts on the side structure, impart an impact force on the former that may result in denting, dimpling or creasing of the container wall. Also, when the containers are subjected to vibration against the tray side structure over an extended period, it is conceivable, in the worst case, that a hole can be produced in the container wall. In a less severe case, the graphics on the container wall can be obliterated due to the erosive effects of the vibration.

It is to the amelioration of these problems, therefore, to which the present invention is directed.

SUMMARY OF THE INVENTION

Accordingly, it is a principal object of the present invention to provide an improved nestable, low-depth tray for storing and transporting containers such as beverage cans.

It is a further object of the present invention to provide an improved low-depth, nestable tray design which occupies less space both when in a loaded, stacked condition and when in an empty, nested condition.

It is still a further object of the present invention to provide an improved low-depth, nestable tray design which has an open side configuration thereby allowing the containers loaded therein to be readily and more fully seen, counted and identified.

Another object of the present invention is to provide an improved low-depth, nestable tray design which can be readily stacked in a deeply-nested condition, when empty, without requiring any extra manipulation of one tray relative to another for removal.

A still further object of the present invention is to provide a plastic low-depth, nestable tray which is light in weight, economical to manufacture, and attractive.

It is yet a further object of the present invention to provide an improved nestable, low-depth tray whose stacking, when filled, into stable palleted loads can be assured.

Another object of the present invention is to provide an improved, nestable, low-depth tray in which the danger of shingling of the trays during palleting has been eliminated.

Still another object of the present invention is to permit the nesting of a large number of empty trays to create a high stack without danger of pressing adjacent trays into one another to render difficult their separation or to render them unusable due to damage.

Yet another object of the invention is to provide an improved low-depth tray construction in which the damage to the container wall caused by impact between it and the tray side structure caused by tipping of the container or by vibration-induced rubbing has been removed.

In order to achieve these objects there is provided herein a novel low-depth, nestable tray for fluid containers. The tray is formed by integrally molding from plastic three basic components, namely, a floor, an upwardly spaced rail and a plurality of inclined columns for spacedly supporting the rail from the floor. The floor has on its top surface a plurality of container support areas, each for supporting thereon a separate fluid container. The underside of the floor surface, in turn, has a number of receiving areas for receiving therein the tops of similar containers in a previously deposited, underlying tray. The rail is formed by an upright band having generally vertical inner and outer surfaces and a rim at the top thereof which projects outwardly a slight distance from the enclosed region of the tray. The rail is positioned above the floor and extends generally parallel thereto so that the rim of the rail is positioned below the tops of the enclosed containers, but sufficiently high with respect to their centers of gravity to prevent them from tipping. The columns extend between, interconnect and merge with the floor and the rail. They are spaced around the periphery of the floor and between adjacent container support areas. Each of the columns is inclined and has a bowed, generally truncated conical shape to define a longitudinal slot disposed outwardly of the tray with respect to the floor, and extending generally from the bottom of the floor up to the rim of the rail. The slots each taper upwardly, are inclined inwardly toward the tray floor, and are configured to slidingly receive therein corresponding columns in a similarly-formed tray when the trays are nestably stacked. The spaces between adjacent columns and between the rail and floor along both sides and ends of the tray are open providing a light weight design which allows more complete visualization of the containers held therein. The floor preferably has an open gridwork design which not only is attractive, but also requires less plastic material and therefore renders the instant tray lighter and lower in cost than one with a more solid floor design.

According to one aspect of the novel tray construction, a cam device is provided on the side structure defined by the tray rails, preferably being disposed on each of the rectangularly arranged sides of the tray. Each cam device has a cam surface adopted to engage the rim of the facing rail of an adjacent tray, thereby to positively prevent shingling between the trays. The cam device may be in the form of a rib attached, or integrally formed on, the tray rail and is designed to present the cam surface in the form of a downwardly and inwardly inclined surface no higher than, and preferably below, the lower edge of the tray rail. Where the rail rim may be formed by an outwardly projecting lip flange, the rib forming the cam device is disposed to depend from the underside of the flange and, preferably, is of a size to project the cam surface outwardly from the tray side structure no less than its furthest projecting element.

According to another aspect of the invention, the side structure of the tray includes depending struts that extend substantially parallel to the rib on opposite sides thereof. The struts extend downwardly a distance less than the vertical extent of the rib so as to insure no interference from the struts with the operation of the rib. At their lowest ends the struts are each formed with an inwardly facing, downwardly inclined surface that cooperates with a downwardly inclined, outwardly facing surface formed on the rim of the tray rail to urge the tray side structure inwardly when the struts abut this region and thereby prevent its spreading when the trays are stacked, particularly in a high stack array.

The cam rib, as well as the struts, are preferably disposed within the outwardly facing slot formed by the bow-like configuration of the rail support columns. In order to prevent the cam device from interfering with the operation of the struts, the inwardly projecting surface of each column is provided with a vertically extending groove which is sized to receive the rib on the corresponding column of the overlying tray when the trays are nested.

Although it may not be necessary to provide a rib and struts on each column in the tray, it is preferred that such be provided in at least one column on each rectangularly arranged side of the tray so as to, on the one hand, permit operation of the invention regardless of the orientation of the tray during palletizing and, on the other hand, to enable spreading of the side structure to be prevented about its entire periphery. Also, the described tray may be provided about the peripheral edge of the floor with a low, upstanding shoulder that conforms to the shape of the bottom rim of the fluid containers and positions those containers standing adjacent the tray side structure sufficiently removed therefrom to effectively prevent contact between the container walls and the side structure.

For a better understanding of the invention, its operating advantages and the specific objectives obtained by its use, reference should be made to the accompanying drawings and descriptions which relate to a preferred embodiment thereof.

PREFERRED EMBODIMENT OF THE INVENTION

Figure 1:
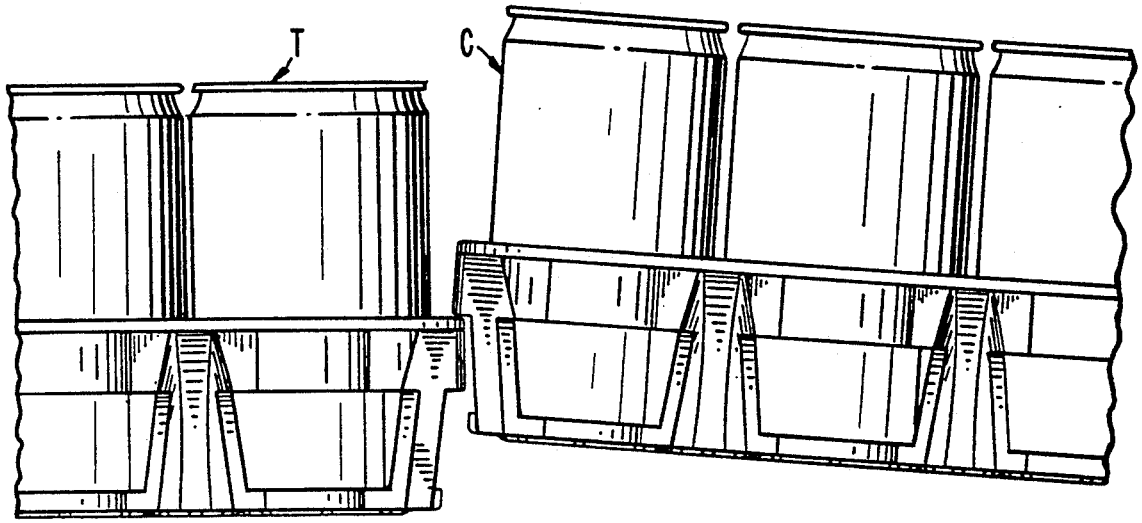
FIG. 1 is a side elevational view of a pair of adjacent low-depth trays of prior art design filled with fluid containers and disposed in a shingled condition.

The tray apparatus of the present invention is identified generally in the drawing figures by the numeral 10. It is adapted to hold twenty-four metal cans, typically twelve-ounce beverage containers that may be formed of aluminum. The cans, which are made to stand upright in the tray, may be retained individually or in six-pack clusters.

The tray 10, many of the details of which are described and illustrated in U.S. patent application Ser. No. 369,598, is integrally formed from a molded plastic material, such as polyethylene, and comprises principally a generally rectangular floor 12, a side structure 14 containing an enclosing rail 16 maintained in vertically spaced relation with respect to the floor by means of a plurality of columns 18 disposed in longitudinally spaced relation about the periphery of the apparatus. Support posts 20 located at each of the four corners of the tray serve to maintain the rail 16 in spaced relation to the floor 12 and provide additional corner support for the tray 10.

Figure 2:
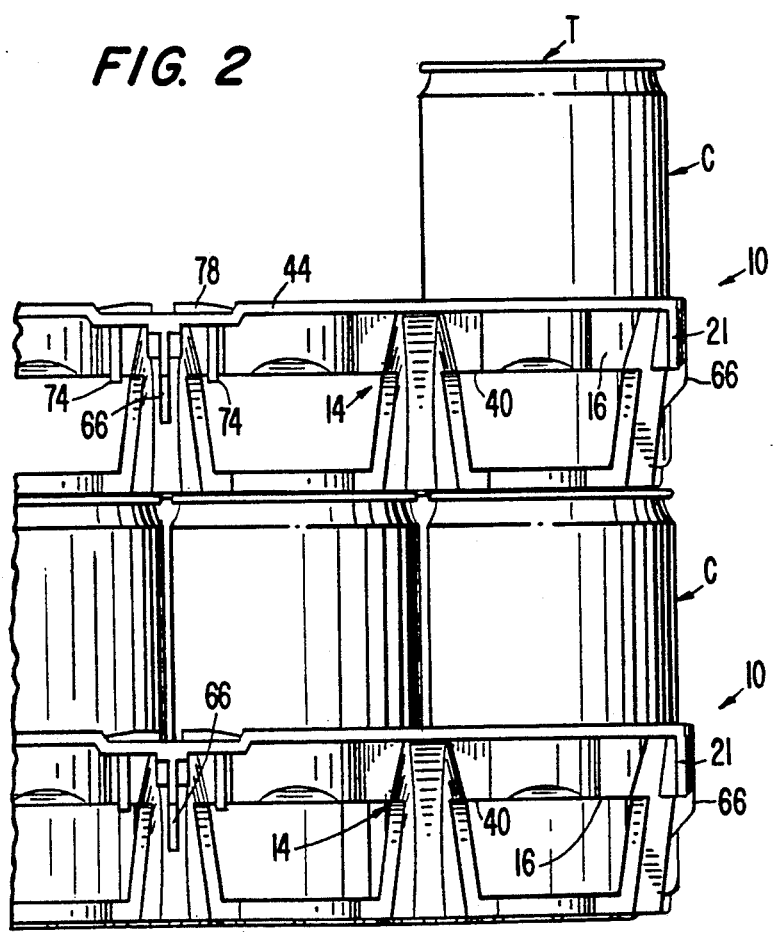
FIG. 2 is a side elevational view of a pair of low-depth trays according to the present invention containing fluid containers and illustrated in stacked condition.
Figure 3:
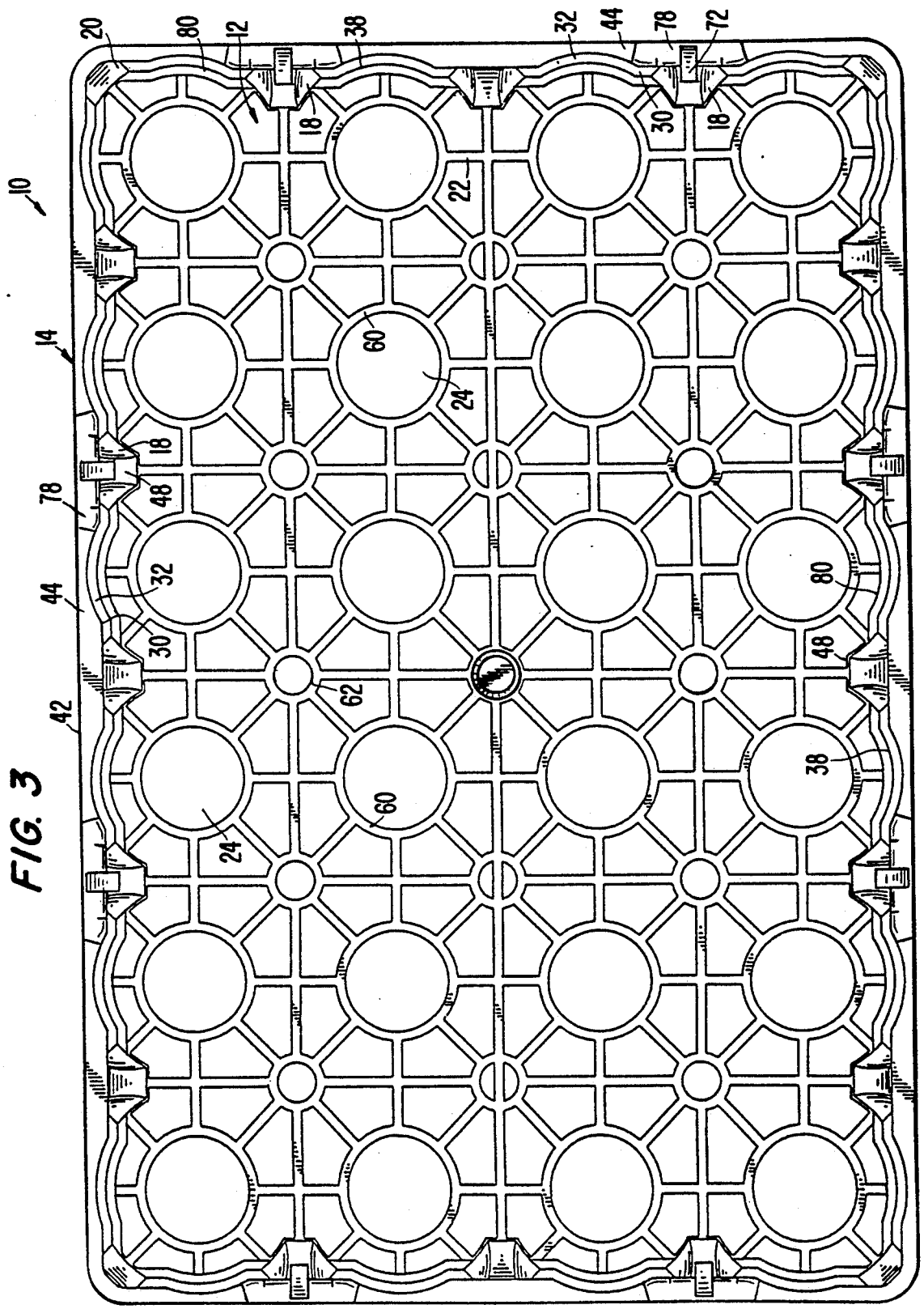
FIG. 3 is a top plan view of the form of tray illustrated in FIG. 2.

The floor 12, as shown best in FIG. 3, has an upwardly facing top surface 22 formed with a plurality, here shown as being twenty four in number, of fluid container support areas 24, each being adapted to maintain a container in the form of beverage can C in an axis-vertical, standing condition. The oppositely facing, underlying floor bottom surface 26 has a corresponding number of receiving areas 28 for engagement with the tops of the fluid containers held in a subjacent tray when the filled trays are stacked as represented by the illustration of FIG. 2.

The rail 16 that forms part of the side structure 14 is an integrally-formed rectangularly disposed member having a generally undulating upstanding wall whose inner surface 30 is formed with an arcuate recess 32 and whose outer surface 34 is convexly formed, as at 36, to accommodate the recess adjacent each outermost container support area 24 about the tray periphery. The floor 12 also has an undulated configuration about its periphery, curving outwardly at locations 38 adjacent the outermost support areas 24. In this way the cylindrical surface of each adjacent fluid container C is maintained in a stabilizing manner.

The rail 16 has a lower edge 40 vertically spaced from the floor 12. The upper edge of the rail 16 is formed with an outwardly projecting lip flange 42 substantially coextensive with the side structure and defining a rim 44. The corners 46 of the rail 16 are smoothly rounded, as are the edges of the lip flange 42.

The rail 16 is maintained in an elevated position above the floor 12 by the columns 18. As illustrated in FIG. 2, the rail 16 is, as is characteristic of trays of "low depth" configuration, maintained at a height less than that of the containers C but nonetheless at a height sufficient to prevent the containers from tipping. Thus, the containers C, in extending above the tray side structure 14, enable their tops T to provide support for a filled superposed tray when the trays are stacked. In this way, the containers themselves directly support the weight of the loaded superposed trays, thereby reducing the strength requirements of the trays.

Figure 4:
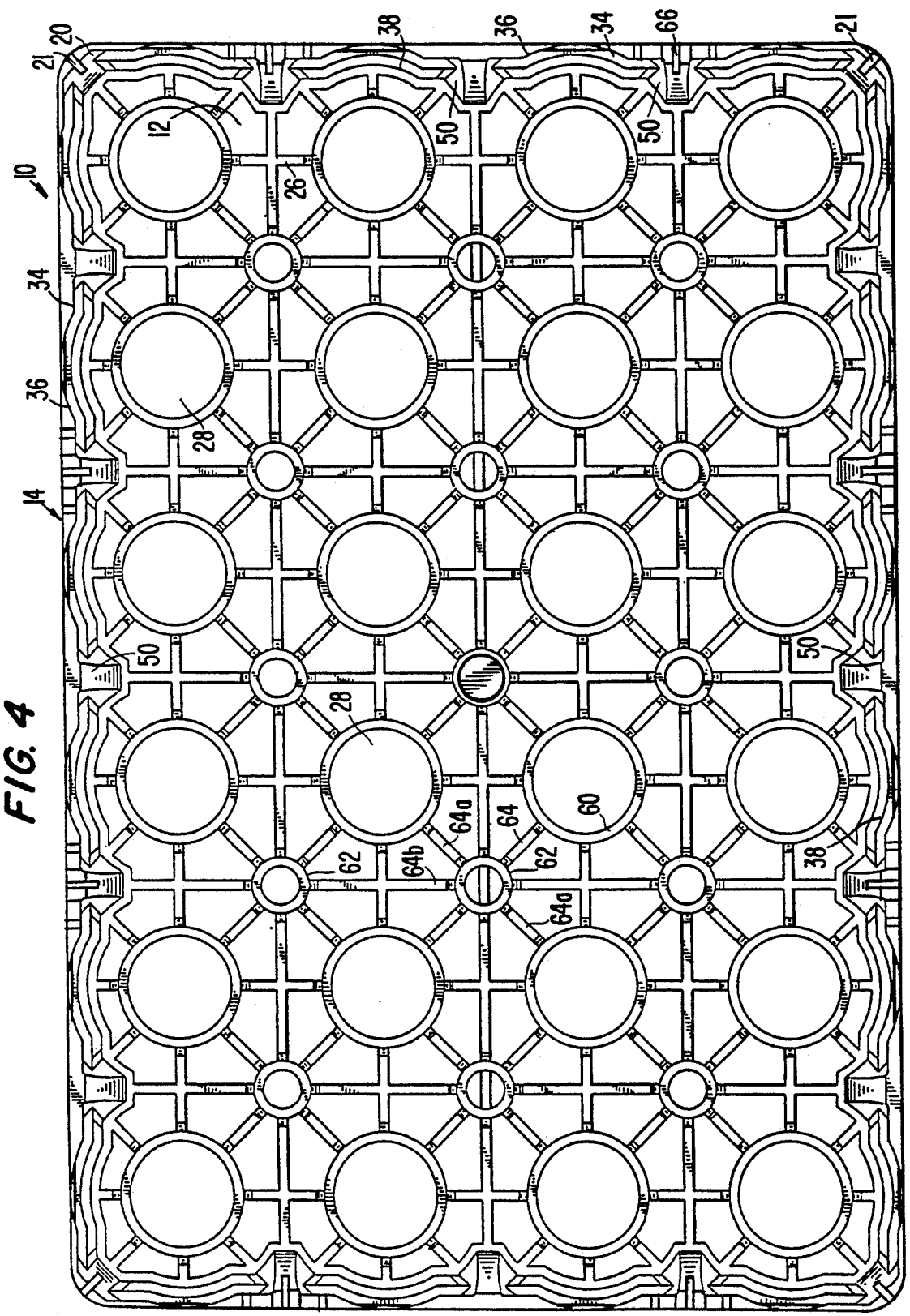
FIG. 4 is a bottom plan view of the tray of FIG. 2.

As shown in FIGS. 3 and 4, the columns 18 are disposed between adjacent support areas 24 and extend upwardly from the floor 12 to the rail 16. The columns 18 are formed of a bow-like construction defining an inwardly extending projecting surface 48 and an outwardly projecting recess 50 defining a vertically inclined slot. In practice, the columns 18 each contain a truncated conical configuration defined by three angularly related flat members, 54, 56 and 58. The intermediate column-forming member 54 is disposed substantially parallel to the tray side structure 14 and extends inclinedly upwardly and outwardly. The members 56 and 58 each diverge laterally from opposed sides of the member 54 and are formed to accommodate the inclination thereof, thus to produce the inclined, truncated configuration to each column.

Figure 5:
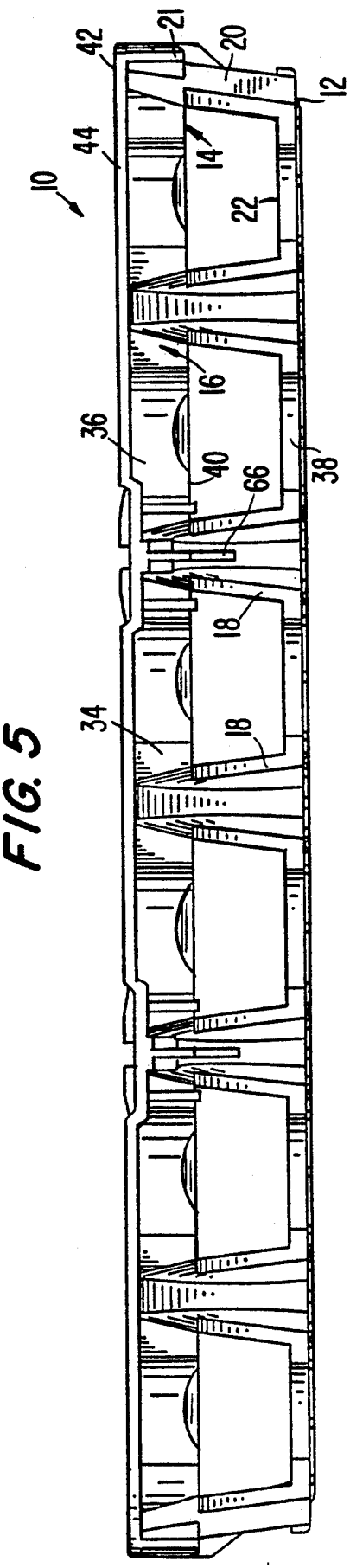
FIG. 5 is a side elevational view of the tray of FIG. 2.
Figure 6:
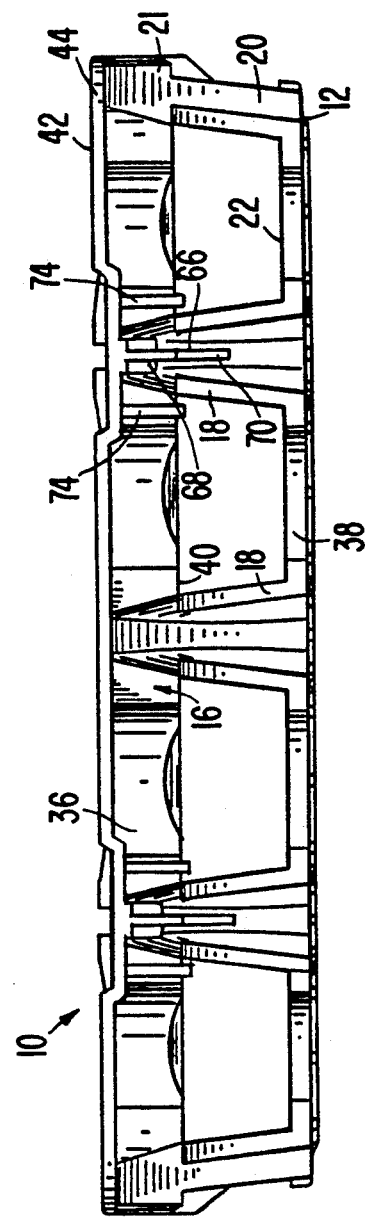
FIG. 6 is an end elevational view of the tray of FIG. 2.

The corner support posts 20, as shown best in FIGS. 5 and 6, are also inclined upwardly and outwardly and are adapted for mutual nested engagement with the corresponding member in an adjacent tray. Depending rib-like members 21 formed on the exterior surface of the respective corner posts 20 form shoulders for vertically supporting adjacent nested trays at the corners.

The top surface of the floor 12 can be a continuous, smooth planar surface or it can be provided with indents or recesses in the respective support areas 24 for receiving and retaining therein the bottom ends of the respective fluid containers C. Preferably, in order to require less material for its construction thereby reducing the cost and weight of its construction, the floor 12, as shown in the drawing figures, has a molded grid-like construction defining a pattern of open spaces thereabout. The illustrated pattern desirably contains a plurality of circular members 60 that are each concentrically disposed in the respective support areas 24. The members 60 have a diameter which is slightly smaller than that of the rim formed on the fluid containers so that the member can be received within the rim, thereby to stabilize the position of the respective containers on the floor 12.

Interspersed between the circular members 60 are other circular members 62 of significantly smaller diameter than that of the members 60. A plurality of radial struts 64 radiate from each of the smaller circular members 62. One set of these radial struts, indicated in FIGS. 3 and 4 by numerals 64a, extend between and interconnect the smaller circular members 62 with the adjacent larger circular members 60. The other set of radial struts, indicated as 64b, comprises struts that extend parallel to the longitudinal and lateral axes of the tray to complete the grid-like structure thereof.

A first principal aspect of this invention addresses the problems illustrated in FIG. 1 of the drawings wherein, frequently, two adjacent trays 10, having been deposited by a palletizing apparatus onto an underlying pallet, are placed in a condition in which the lower edge 40 of the rail 16 on one of the trays is caused to lodge on the surface of the rim 44 of the lip flange 42 of the adjacent tray thereby placing the affected end of the tray in an undesirable raised condition. In order to prevent the occurrence of such a condition, the side structure 14 of the trays 10 of the present invention are provided with camming devices 66 preferably disposed at selected locations about the periphery of the tray 10 and being particularly positioned and formed to positively prevent the lower edge 40 of the rail 16 of one tray from lodging on the rim surface of the lip flange 42 of an adjacent tray.

Thus, in the described tray construction, selected ones, but preferably at least one, of the columns 18 on each rectangularly arranged side of the tray, are provided with a camming device 66 in the form of a vertically extending rib 68 (FIG. 8) disposed on the outwardly facing surface of the side structure. The rib 68 is advantageously positioned within the recess 50 of the selected column, integrally formed on the outwardly facing surface of the intermediate column-forming member 54. The lower end of the rib 68 contains a downwardly and inwardly directed camming surface 70 adapted to engage the rim surface 44 of a previously placed tray and, due to the impetus of the downward movement of the former tray, cause the end of the falling tray to be guided away from the concerned rim surface either by causing one or the other or both of the previously placed tray or the falling tray to undergo sufficient longitudinal movement to prevent any lodgment of one tray on the other.

In order to insure proper functioning of the camming device 66, the rib 68 is caused to extend outwardly of the tray no less than the extent of outward extension of the lip flange 42, which represents the outermost element of the tray. Also, the camming surface 70 on the bottom end of the rib 68 should, as shown, be disposed below the lower edge 40 of the rail 16.

According to the embodiment of the invention shown in FIG. 8, therefore, the rib 68 has its upper end integrally connected to the undersurface of the lip flange 42 such that the rib depends therefrom to a level that places the camming surface 70 below the lower edge 40 of rail 16. Also, the innermost end of the rib 68 is integrally connected to the outwardly-facing surface of the column-forming member 54 and its outermost surface portion is positioned substantially flush with the outermost edge of the lip flange 42.

On its inwardly-facing portion the side structure 14 is provided opposite the rib 68 with a downwardly and inwardly extending recess or groove 72, here shown as being formed on the inwardly-facing surface of the intermediate member 54 forming column 18. The groove 72, as shown, extends upwardly through the surface of the rim 44 of the lip flange 42 and is adapted to receive the rib 68 in the corresponding column 18 of a superposed tray.

It will be appreciated that, when empty, the trays 10 are designed to be compactly nested so as to be stored in a minimum of space. In nesting of the trays 10 wherein corresponding columns 18 are caused to be vertically slidingly received in the slots 50 produced by the bow-like sectional shape of the assemblage of the members 54 to 56, the rib 68 does not interfere with nesting because the rib in the corresponding column 18 of a superposed tray 10 is received in the groove 72. Thus, there is no interference between the rib 68 and the subjacent tray 10 during nesting and the stack of nested trays can be compacted to assume a minimal vertical dimension.

Figure 10:
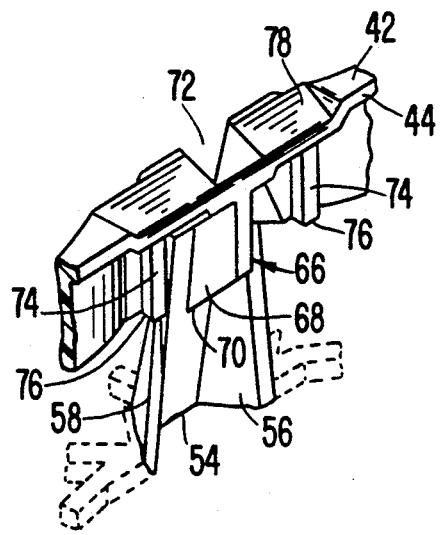
FIG. 10 is a partial perspective view similar to FIG. 8 illustrating the other embodiment of the invention.
Figure 13:
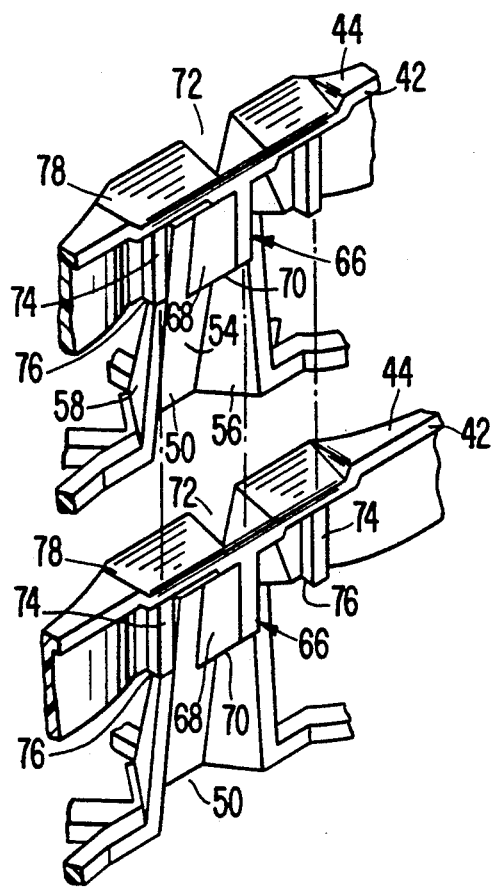
FIG. 13 is a partial exploded view illustrating the interrelation of the elements during nesting of the trays according to the invention.
Figure 15:
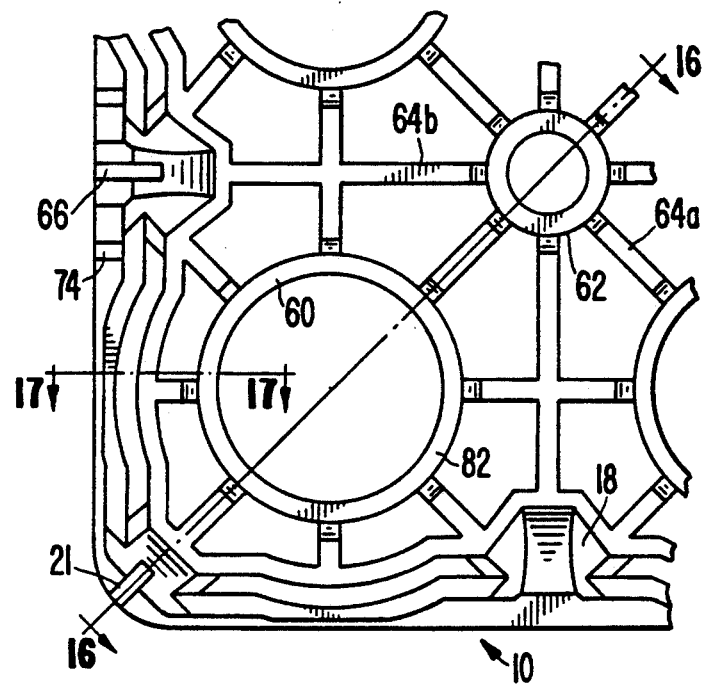
FIG. 15 is an enlarged partial bottom plan view of a corner section of the tray according to the present invention.
Figure 18:
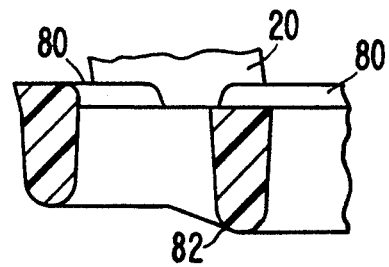
FIG. 18 is an enlarged view of the encircled region of FIG. 16.
Figure 16:
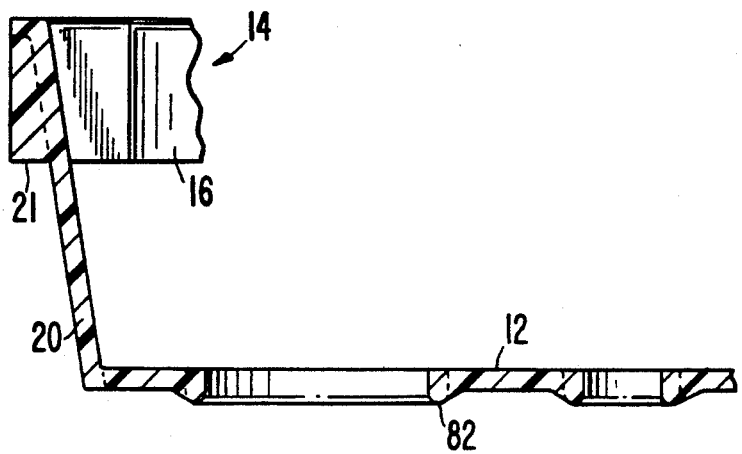
FIG. 16 is a partial sectional view taken along line 16—16 of FIG. 15.
Figure 17:
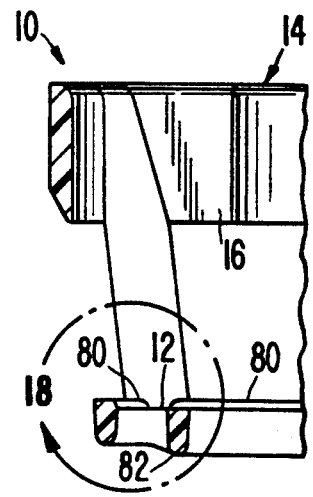
FIG. 17 is a partial sectional view taken along line 17—17 of FIG. 15.

According to a second principal aspect of the invention, the trays 10 are each provided with apparatus effective to prevent outward spreading of the side structure 14 of particularly those trays on or near the bottom of a nested stack of significant height. To accomplish this, as best shown in FIGS. 10 and 13, the side structure 14 of each tray 10 is provided with depending struts 74, the bottom ends 76 of which are inclined in an upward and inward direction and are adapted to engage a cooperatively formed downwardly and inwardly sloping surface portion 78 on the lip flange 42 of an underlying tray when the trays are stacked. The struts 74 are arranged in pairs, each disposed on opposite sides of the depending rib 68 on the outwardly facing surface of the side structure 14. The struts 74 are conveniently made to depend from the underside of the lip flange 42 but, as shown in the drawings, extend laterally outwardly from the side structure 14 to an extent less than that of the rib 68. Also, so as not to interfere with operation of the camming surface 70 on rib 68, the vertical extent of the struts 14 is less than that of the rib.

The sloped surface portion of the rim 44 that cooperates with the struts 74 may extend about the entire extent of the lip flange 42 or, preferably, be disposed only in those regions of the flange surface that overlie the struts 74. Thus, as shown in the drawings, the concerned surface portions 78 of the lip flange 42 extend above selected columns 18 in overlying relation to the struts 74 and intermediately positioned depending rib 68.

Figure 7:
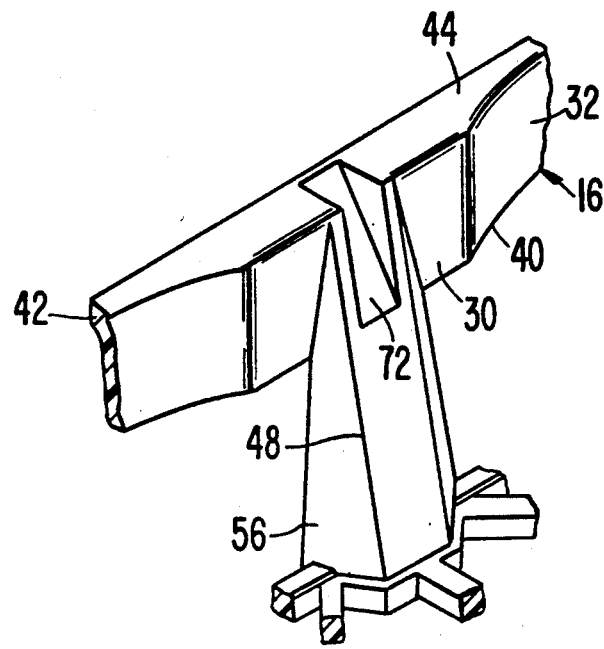
FIG. 7 is a partial perspective view of the tray of FIG. 2 illustrating a side structure according to one embodiment of the invention as viewed from the interior region of the tray.
Figure 8:
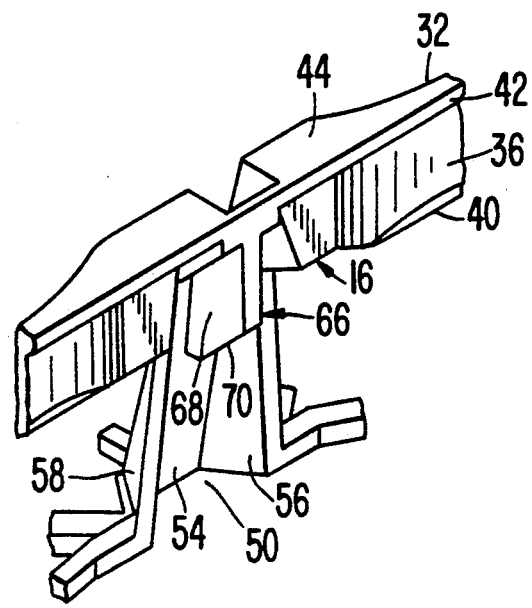
FIG. 8 is a partial perspective view of the tray of FIG. 2 illustrating the opposite view of the side structure from that shown in FIG. 7.
Figure 9:
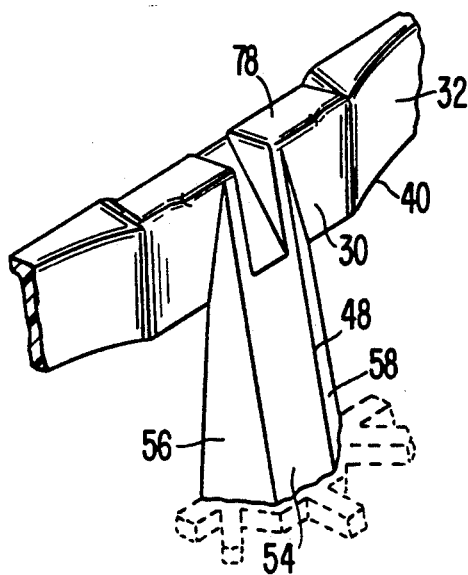
FIG. 9 is a partial perspective view similar to FIG. 7 illustrating another embodiment of the invention.
Figure 11:
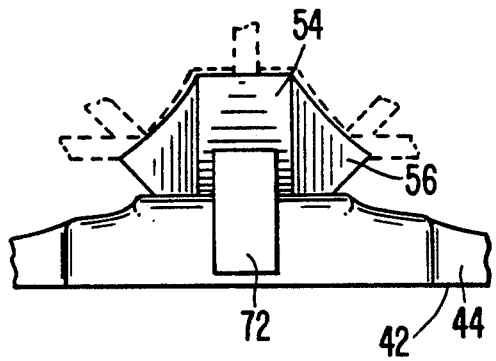
FIG. 11 is a partial plan view of the portion of the structure shown in FIG. 9.

As in the embodiment of the invention illustrated in FIGS. 7 and 8, the columns 18 that contain the struts 74 and rib 68 are provided in the inwardly facing member 54 with a downwardly and inwardly inclined recessed groove 72 which penetrates the surface portion 78 and is adapted to receive the rib 68 of an overlying tray 10 when the trays are nestedly stacked. It will be appreciated that, although the grooves 72, as in the previously described embodiment, permit more compact nesting of the trays 10, in this embodiment of the invention they provide the additional effect of preventing the ribs 68 from interfering with the operation of the struts 74 to prevent spreading of the tray side structure 14 when the empty trays are nestedly stacked.

With particular reference to FIGS. 15 through 18 there is shown an enlarged detailed illustration of a corner region of the tray 10. As shown, each corner post 20 is an upwardly and outwardly inclined, generally planar member which extends diagonally between intersecting sides of the floor 12 and side structure rail 16. A shouldered rib 21 is provided on the external surface of each port member 20 depending from the lip flange 42 to a level corresponding substantially to the lower edge 40 of rail 16 whereby to provide a positive support stop for the respective nested trays at the corners thereof.

These drawing figures also illustrate means provided on the described tray 10 for effectively establishing the relative position between fluid containers loaded in the respective trays and when the load trays are in a stacked condition. First, as shown best in FIGS. 3, 17 and 18, the floor top surface 22, about the periphery thereof, is provided with an upstanding shoulder 80 that extends between adjacent columns 18 which separate the outermost fluid container support areas 24. The shoulder 80 includes an arcuate portion 82 that is concentrically spaced from the large circular member 60 of the adjacent support area 24 and is positioned inwardly from the plane of the overlying rail 16. The profile of the shoulder 80 conforms generally to the rim about the bottom of a typical beverage container C so that the cooperative effect of the position of the shoulder 80 and its shape is to prevent contact between the wall of the containers stored in the outermost container support areas 24 and the adjacent rail 16.

Augmenting the prevention of contact between the fluid containers C stored in the trays 10, particularly when the filled trays are vertically stacked, is the provision of an annular rib 82 projecting from the bottom surface of each large circular member 60 of the respective support areas 24. The diameter of the members 60 and, particularly, of the annular ribs 82 depending therefrom is such that the ribs can be received within the recesses formed within the upper rims of fluid containers C stored in an underlying tray so as to effectively position the containers and stabilize their location in the stack.

Figure 12:
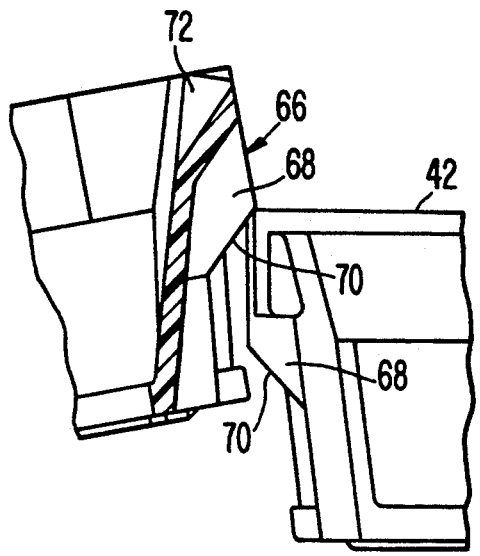
FIG. 12 is a partial elevational view, partly in section, illustrating operation of the invention to present shingling.
Figure 14:
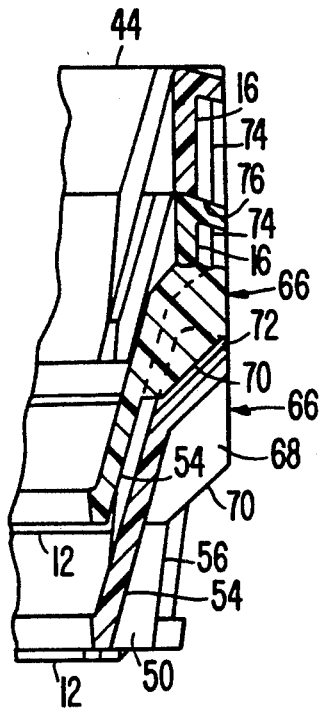
FIG. 14 is a partial sectional view illustrating the operation of the struts during nesting of the trays according to the invention.

As the above disclosure indicates, the described fluid container tray construction provides a simple and inexpensive solution to distinct, but equally important problems arising from the utilization of trays of the "low depth" configuration. As exemplified by the illustration of FIG. 12, the provision of the outwardly facing depending rib 68 whose camming surface 70 extends below the lower edge 40 of rail 16 and outwardly at least as far as the outermost member of the tray 10, provides an effective device to prevent "shingling" of adjacent trays during the palletizing operation. Furthermore, as illustrated in the exploded view of FIG. 13, the trays 10, when empty, can be effectively nested by the vertical sliding movement and reception of the respective columns 18 in the recesses or slots 50 resulting in the respective members from their bow-like construction. The drawing figure indicates, moreover, that, when the trays 10 are nested, the inclined lower ends of struts 74 on an overlying tray 10 are permitted to effectively engage the cooperating regions 78 of the upper surface of the lip flange 42 of an underlying tray due to the reception of the rib 68 on the former into the recessed groove 72 in the latter. Thus, any downwardly directed, compressive force transmitted from an overlying tray to an underlying tray will, due to the cooperation between the inclined strut surface 76 and the sloping surface 78 of the facing rim, as shown in FIG. 14, prevent spreading of the side structure 14 of the underlying tray and, contrariwise, will result in the affected side structure being urged inwardly in the direction of the enclosed region of the tray.

It will be understood that various changes in the details, materials and arrangements of parts which have been described and illustrated herein in order to explain the nature of the invention, may be made by those skilled in the art within the principle and scope of the invention as expressed in the appended claims.

What is claimed is:

1. A low-depth, nestable tray for a plurality of fluid containers, comprising:

a floor having a generally rectangular periphery and including a top surface for supporting said fluid containers in a standing condition;

means forming a side structure defining an enclosure about said floor, said side structure including a rectangularly arranged rail substantially coextensive with the periphery of said floor and having a generally planar upper rim and its lower edge vertically spaced from said floor;

a plurality of columns disposed at spaced locations about the periphery of said tray and extending between and interconnecting said floor and said rail, said columns being inclined downwardly and inwardly with respect to said enclosure and being formed in section as a bow-like structure defining an inwardly facing projection and an outwardly facing slot for nested reception of a cooperating column of an underlying tray;

a generally vertically extending rib disposed within said outwardly facing slot in selected ones of said columns, said rib having a downwardly and inwardly inclined cam surface extending no less than to the lower edge of said rail and being adapted to engage the side structure of an adjacent tray to prevent shingling between the respective trays.

2. The tray of claim 1 including a generally vertically extending groove formed in the projection face of said selected columns in oppositely disposed relation from said rib, said groove being adapted to receive the rib of a corresponding column of a superposed tray when said trays are disposed in nested relation.

3. The tray of claim 2 in which said groove has a vertical length at least as great as that of said rib.

4. The tray of claim 2 in which said columns are formed of planar sides arranged in truncated conical form, with one of said sides being disposed substantially parallel to said rail, said one planar side carrying said rib on its outwardly facing surface and its inwardly facing surface opposite said rib containing said groove for reception of a rib on a column of a superposed, nested tray.

5. The tray of claim 4 including a flange surmounting said rail and extending outwardly therefrom to define said upper rim, said rib depending from said flange and extending outwardly from said rail to an extent no less than the outward extent of said flange.

6. The tray of claim 1 including at least one column on each rectangular side of said tray containing a rib having a camming surface.

7. The tray of claim 1 including strut means disposed on said rail and having lower ends adapted to abut the upper rim of an underlying tray when said trays are disposed in nested relation.

8. The tray of claim 7 including a generally vertically extending groove formed in the projection face of said selected columns in oppositely disposed relation from said rib, said groove being adapted to receive the rib of a corresponding column of a superposed tray when the strut means thereof abut the upper rim of the underlying tray.

9. The tray of claim 7 including a flange surmounting said rail and extending outwardly therefrom to define said upper rim; said flange in the region overlying said strut means being inclined downwardly and outwardly; and said strut means comprising a strut depending from the underside of said flange and having its lower end containing an inclination in conformity with the inclination of said flange thereby tending to urge inwardly the rail of said underlying nested tray.

10. The tray of claim 9 in which the lower end of said strut is at a level elevated above the camming surface on said rib.

11. The tray of claim 9 in which said strut extends outwardly from said rail a distance less than the outward extent of said rib from said rail.

12. The tray of claim 8 in which said downwardly inclined region of said flange contains an opening intermediate the ends thereof defining the upper end of said groove and said strut means comprises a strut disposed on opposite sides of said rib and each having its lower end containing an inclination in conformity with the inclination of said flange for engagement with the flange of an underlying nested tray on opposite sides of the opening thereof.

13. The tray of claim 12 in which the lower ends of said struts are at levels elevated above the camming surface of said rib.

14. The tray of claim 12 in which each said strut extends outwardly from said rail a distance less than the outward extent of said rib from said rail.

15. The tray of claim 12 in which the lower ends of said struts are at levels elevated above the camming surface of said rib, and each said strut extends outwardly from said rail a distance less than the outward extent of said rib from said rail.

16. A low-depth, nestable tray for a plurality of fluid containers, comprising:
   a floor having a top surface for supporting said fluid containers in a standing condition;
   means forming a side structure defining an enclosure about said floor, said side structure terminating at its upper end in a rim having a surface that is inclined downwardly and outwardly;
   strut means disposed on said side structure in depending relation from said rim and having lower ends angularly formed to conform with the inclination of said rim surface whereby said strut means, when abutting the rim surface of an underlying nested tray, tends to urge the side structure inwardly of the tray enclosure.

17. The tray of claim 16 in which said side structure comprises a rectangularly arranged rail substantially coextensive with the periphery of said floor; and strut means on each rectangularly disposed side of said rail for urging said rail inwardly of said enclosure about the entire periphery thereof.

18. The tray of claim 17 including a flange surmounting said rail and extending outwardly therefrom to define said rim, said flange presenting a generally horizontal upper surface, except in the region overlying said strut means.

19. A low-depth, nestable tray for a plurality of fluid containers, comprising:
   a floor having a top surface for supporting said fluid containers in a standing condition;
   means forming a side structure defining an enclosure about the periphery of said floor, said side structure including a rail substantially coextensive with the periphery of said floor and supportedly disposed at a level intermediate the height of said fluid containers; and
   shoulder means including a shoulder member having a profile conforming generally to the profile shape of the bottom rim of said fluid container upstanding from said floor top surface adjacent the peripheral edge thereof, said shoulder being operative to engage the lower end of an adjacent fluid container for retaining said fluid container in spaced relation from said side structure.

20. The tray of claim 19 in which said side structure includes a plurality of columns longitudinally spaced about the periphery of said floor and extending between and interconnecting said floor and said rail, a plurality of container support areas defined in said floor top surface, said shoulder means includes a plurality of shoulder members extending between adjacent columns about the periphery of said floor.

21. The tray of claim 20 in which each said shoulder member has an arcuate longitudinal shape and a surface profile conforming generally to the profile shape of the bottom rim of an adjacent fluid container.

22. The tray of claim 21 in which said floor is formed as a molded grid-like structure including circular elements in each of said container support areas for disposition subjacent the lower end of a fluid container supported therein, the bottom surface of said floor including annular ribs projecting from the bottom surface of said circular elements adapted for reception within the upper rim of fluid containers standing in a subjacent tray.

23. A low depth, nestable tray for a plurality of fluid containers, comprising:
   a floor having a top surface for supporting said fluid containers in a standing condition;
   a side structure upstanding from said floor and defining an enclosure thereabout, said side structure terminating at its upper end in a rim and including a plurality of substantially downwardly and inwardly inclined columns disposed at spaced locations about the periphery of said tray, said columns being substantially bow-like in section defining an inwardly-facing projection and an outwardly facing slot for nested reception of a corresponding column of an underlying nested tray;
   a generally vertically extending rib disposed within the slot of selected ones of said columns about the periphery of said tray and projecting exteriorly of said side surface to define cam means adapted to engage the side structure of an adjacent tray for preventing shingling between adjacent trays.

24. The tray of claim 23 in which each of said selected columns contains a vertical groove on the inwardly-facing projection side thereof for receiving the rib in the corresponding column of a superposed tray when said trays are disposed in nested relation.

25. The tray of claim 24 in which said columns are formed of planar sides arranged in truncated conical form, with one of said sides being disposed substantially parallel to an inner surface of said rail, said one planar side carrying said rib on its outwardly facing surface and its inwardly facing surface containing said vertical groove for reception of the rib of a superposted nested tray.

26. The tray of claim 25 in which said vertical groove is formed of a length at least as great as that of said rib.

27. The tray of claim 24 in which said side structure includes a generally vertically disposed rail substantially coextensive with the periphery of said tray with its lower edge vertically spaced from said floor, said columns extending between and interconnecting said floor and said rail.

28. The tray of claim 23 in which said rim at the upper end of said side structure contains a downwardly and outwardly inclined surface; and
   said tray including strut means disposed on the exterior face of said side structure adjacent said rib, said strut means having downwardly projecting surfaces adapted to engage the inclined surface of an underlying tray and cooperating therewith to urge said side structure underlying said surface inwardly when said trays are disposed in nested relation.

29. The tray of claim 28 in which said strut means comprise at least one vertically elongated strut extending generally parallel to said rib and being of a length less than that of said rib.

30. The tray of claim 29 in which said strut means comprise a pair of vertically elongated struts disposed on opposite sides of said rib.

* * * * *